(No Model.) 2 Sheets—Sheet 1.

J. H. BLESSING.
APPARATUS FOR PURIFYING WATER.

No. 402,224. Patented Apr. 30, 1889.

Witnesses:
S. B. Brewer.
W. W. Seeley.

Inventor:
J. H. BLESSING,
by William H. Low,
Attorney.

(No Model.) 2 Sheets—Sheet 2.

J. H. BLESSING.
APPARATUS FOR PURIFYING WATER.

No. 402,224. Patented Apr. 30, 1889.

Witnesses:
S. B. Brewer,
W. W. Seeley.

Inventor:
J. H. Blessing,
by William H. Low,
Attorney.

UNITED STATES PATENT OFFICE.

JAMES H. BLESSING, OF ALBANY, NEW YORK.

APPARATUS FOR PURIFYING WATER.

SPECIFICATION forming part of Letters Patent No. 402,224, dated April 30, 1889.

Application filed December 8, 1886. Serial No. 221,007. (No model.)

*To all whom it may concern:*

Be it known that I, JAMES H. BLESSING, of the city and county of Albany, in the State of New York, have invented new and useful Improvements in Apparatus for Purifying Water, of which the following is a specification.

This invention relates to improvements on the apparatus for which Letters Patent of the United States Nos. 352,943 and 352,944 were granted to me on the 23d day of November, 1886; and the object of my present improvements is to render the apparatus more efficient in its action. This object I attain by means of the mechanism illustrated in the accompanying drawings, which are herein referred to, and form part of this specification, and in which—

Figure 1:
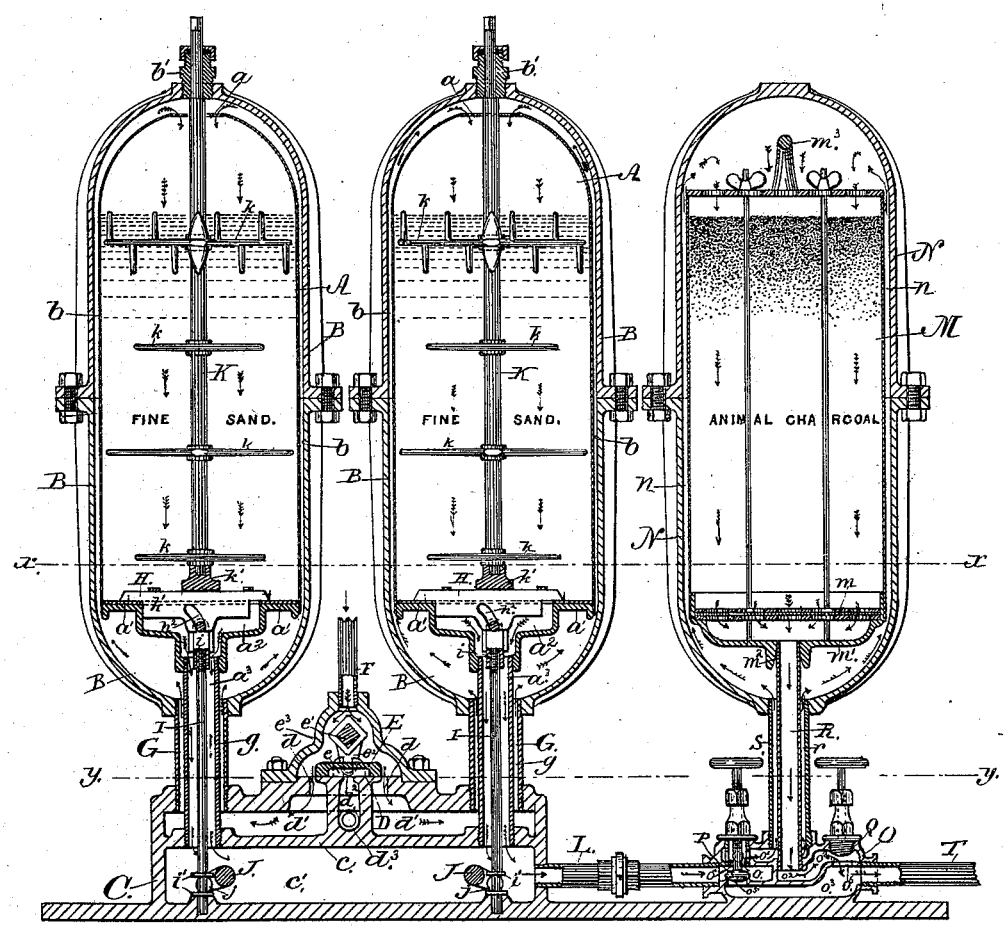
Figure 2:
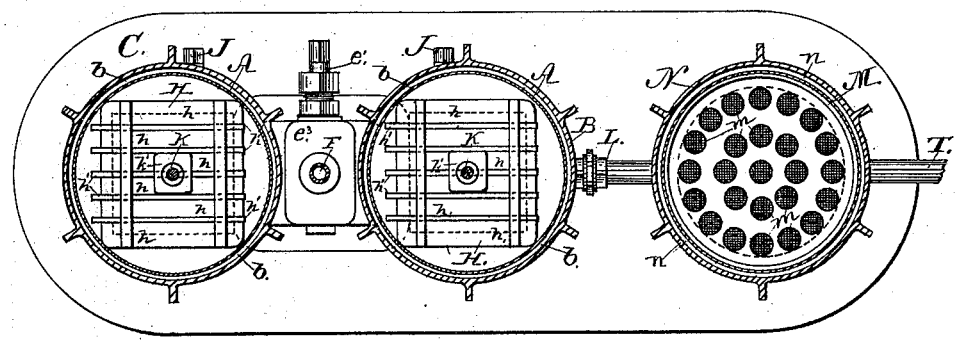
Figure 3:
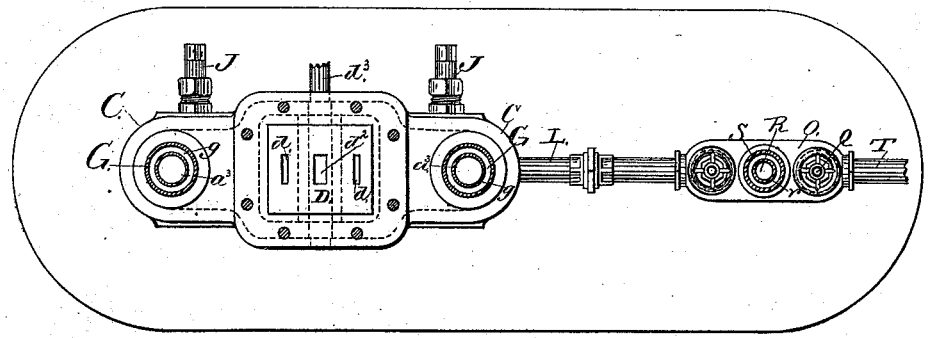
Figure 4:
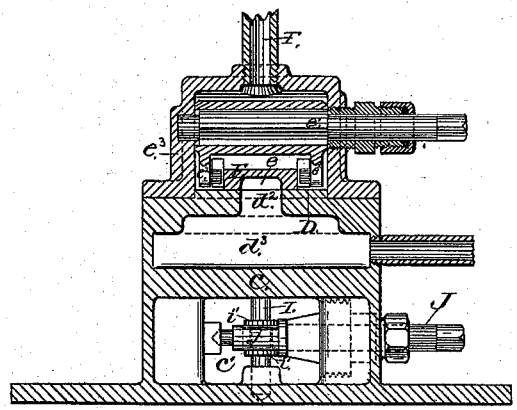
Figure 5:
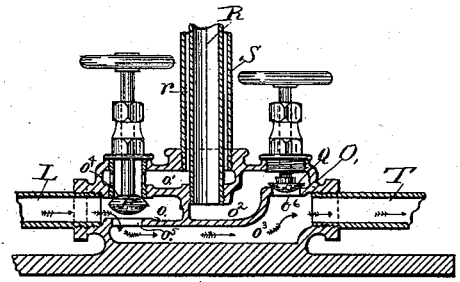
Figure 6:
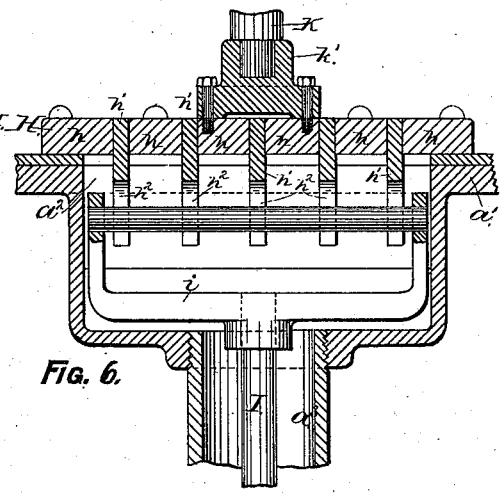

Figure 1 is a longitudinal section of my apparatus; Fig. 2, a horizontal section at the line $x$ $x$; Fig. 3, a horizontal section at the line $y$ $y$; Fig. 4, an enlarged transverse section through the center of the base and valve-chamber for the duplex filtering-chambers; Fig. 5, an enlarged longitudinal section of part of the base and the valve-chest for the chemical filter; Fig. 6, an enlarged transverse section of the percolating-bed shown in Fig. 1, and Fig. 7 a modified form of movable bars for said percolating-bed.

In the duplex filtering apparatus shown in Letters Patent No. 352,943, above referred to, the valve for reversing the currents of water and the supply and water pipes are all placed at the top of the apparatus, and it is obvious that such an arrangement renders complete access to the interior of the filtering-chambers attainable only after much difficult labor, involving the disconnection of pipes and other parts of the apparatus. In the present improvements these defects are remedied.

As represented in the drawings, A indicates the primary filtering-chambers, which are in cylindrical form with a dome-shaped top having an inlet-opening, $a$, at the apex. Said cylinders are preferably made of sheet metal, and each is secured to a bottom plate, $a'$, which is provided with a recess, $a^2$. The filtering-chambers A are inclosed in outer casings, B, which are made in two parts, and are separable at about midway of their height. An annular water-way, $b$, is thus formed between the cylinders of the filtering-chambers and their outer casings for the purpose of obtaining a passage for the water-currents to flow through, as hereinafter described.

C is the base of the primary filtering-chambers. Said base is provided with a horizontal partition, $c$, which divides the filtered-water chamber $c'$ from two unfiltered-water passages, $d'$, and a waste-water outlet, $d^3$. It is also provided with a valve-seat, D, in which is formed the induction-ports $d$, (one for each of the unfiltered-water passages,) and an eduction-port, $d^2$, which leads to the waste-water outlet $d^3$. A slide-valve, E, is fitted to move on the valve-seat D, and is of such length that when in its central position, as shown in Fig. 1, both induction-ports $d$ will be uncovered to permit the water to flow into the passages $d'$ on its way toward the filtering-chambers. The valve E is provided with a pass-over passage, $e$, which, when the valve is moved to cover either of the induction-ports $d$, will form a communication between the then covered induction-port and the eduction-port $d^2$, through which the waste water will pass to the outlet $d^3$. A rocker-shaft, $e'$, which carries the arms $e^2$ that engage with said valve, affords the means for operating the latter when occasion requires. A valve-chest, $e^3$, covers the valve-seat D and valve E, and the inlet-pipe F conveys the water from the source of supply into the apparatus.

Each filtering-chamber A has a pipe, $a^3$, which leads from its bottom, and each of said pipes has its lower end secured into the horizontal partition $c$. Said pipes form passage-ways for the filtered water between said filtering-chambers and the filtered-water chamber $c'$ in the base. Pipes G, having their upper end secured in the bottom of the outer casing, B, and their lower end in the upper side of the base C, surround the pipes $a^3$ and form annular water-ways $g$, one of which leads from each passage $d'$ into the corresponding outer casing, B.

In the bottom of each filtering-chamber A a percolating-bed, H, is fixed to cover the recess $a^2$. Said bed is preferably composed of parallel bars, of which there should be two different series, one of which should be movable, and the other may be either stationary or movable; but in the latter case the two series should be arranged to move in opposite directions. As shown in the drawings, said percolating-bed consists of the stationary bars $h$ and movable bars $h'$, the latter being arranged alternately with stationary bars, and fitted with sufficient closeness thereto to prevent the finest grains of the filtering-sand from entering the joints, but so that the water will ooze through.

As shown in Figs. 1, 2, and 6, the bars $h'$ are adapted to receive a slight endwise movement, and for that purpose each is provided with a diagonal slot, $h^2$, in which the bar of a cross-head, $i$, engages. The latter is secured to the upper end of a vertically-reciprocating rod, I, which passes up through the pipe $a^3$, and to which motion is imparted by means of the rocker-shaft J, whose arms $j$ engage between the collars $i'$ on said reciprocating rod, and the arrangement is such that by the vertical movements of the reciprocating rod I corresponding horizontal reciprocations of the bars $h'$ will be effected. When preferred, the bars $h$ may also be made movable, and by providing them with a diagonal slot, inclined oppositely to those in the bars $h'$, the movements of the bars $h$ will be made in opposite directions to those of the bars $h'$.

Figure 7:
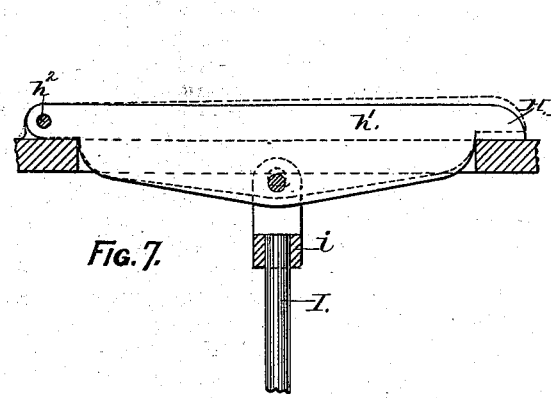

As shown in Fig. 7, the movable bars $h'$ are pivoted at one end, as at $h^3$, to receive a vibratory movement from the reciprocations of the cross-head $i$, as hereinbefore described.

By imparting a movement to the bars of the percolating-bed I am enabled to keep the joints between said bars free from any deposit that would otherwise clog the minute passages through which the water oozes.

The filtering-chambers A are partially filled with a granular filtering material, preferably a moderately fine beach sand, and in order to facilitate the cleansing of this material from the impurities deposited therein each filtering-chamber is provided with an agitator that is composed of a vertical shaft, K, bearing a series of radial arms, $k$. Said shaft passes through a stuffing-box, $b'$, at the top of the casing B, and a hand-crank or other appliance may be attached to the protruding end of said shaft for the purpose of working said agitators. The lower end of the shaft K has its bearing in a step, $k'$, which may be secured to the stationary bars $h$, or other convenient part of the filtering-chamber. A discharge-pipe, L, is attached to the base C, for the purpose of conveying the filtered water from the chamber $c$ to any required point.

The operation of the part of my apparatus hereinabove described is as follows: Water under pressure enters the apparatus through the inlet-pipe F, and while the valve E retains its central position, as shown in Fig. 1, the currents of water will pass down through both induction-ports $d$, laterally through the passages $d'$, then upwardly through the annular water-ways $g$ and $b$, and from thence through the inlet-openings $a$ into both filtering-chambers A. Descending through the beds of filtering material contained in said chambers, the water oozes through the joints between the bars $h$ and $h'$, and passes down through the pipes $a^3$ into the chamber $c$, from which the water, in a filtered condition, can be conveyed to any required point through the discharge-pipe L. To cleanse the filtering material in either of the filtering-chambers A, the valve E is moved to cover the induction-port $d$, which communicates with the filtering-chamber whose filtering material is to be washed. By this movement of said valve its pass-over passage $e$ is carried into position to form a communication between the covered induction-port $d$ and eduction-port $d^2$, and when this is accomplished the water will continue to flow down through the filtering material in the chamber, which is still directly connected with the water-supply, and from thence into the filtered-water chamber $c'$. Passing to the opposite end of said chamber the water flows up through the pipe $a^3$, and then up through the percolating-bed and filtering material of said filtering-chamber. By the upward flow of the water the filtering material is loosened up sufficiently to permit the agitators to be rotated, whereby the particles are so displaced and disturbed that any impurities deposited in the sand will be readily carried off by the water-currents, which will now pass out at the top of the filtering-chamber that is being washed. From thence the water passes downward through the annular water-ways $b$ and $g$; thence through the passage $d'$, induction-port $d$, pass-over passage $e$, eduction-port $d^2$, and escapes through the waste-water outlet $d^3$. In washing the filtering material it will be seen that nothing but filtered water is employed, and by avoiding the use of unfiltered water for that purpose, no impure water is carried into the filtered-water chamber, where it would remain to contaminate the next inflow of filtered water. For the purpose of continuing the purification of the water chemically, I preferably connect with the duplex filtering-chambers, hereinbefore described, a third filtering-chamber which may be used or not at the option of those interested. Said chamber consists of the removable cylinder M, which is preferably filled with animal charcoal or other chemical purifier, and has in its bottom a screen, $m$, which, while it will permit the water to pass freely therefrom, will retain the charcoal in said chamber. The bottom plate, $m'$, of said cylinder is provided with a central screw-threaded opening, $m^2$, having a bell-shaped mouth for the purpose of guiding said opening to its place on the pipe on which the cylinder M is supported. Said cylinder is provided with a yoke or handle, $m^3$, whereby it may be lifted when required. The cylinder M is inclosed in an outer casing, N, preferably made like the outer casings, B, hereinbefore described, and, when fixed in place an annular water-way, $n$, is formed between said cylinder and outer casing. The third filtering-chamber rests upon a valve-chamber, O, in which are formed two inlet water-passages, o and o', and two outlet water-passages, $o^2$ and $o^3$. The inlet water-passage o has in its upper side an opening, $o^4$, that communicates with the inlet-passage o', and it has in its lower side an opening, $o^5$, which leads directly into the outlet-passage $o^3$. The openings $o^4$ and $o^5$ are ranged in line one above the other, so that a double-faced valve, P, will be adapted to close one of said openings when it reciprocally opens the other. An opening, $o^6$, leads from the outlet water-passage $o^2$ into the outlet water-passage $o^3$, and a valve, Q, is fitted to close the last-named opening when occasion requires. A standing pipe, R, leads from the bottom of the cylinder M into the outlet-passage $o^2$ without forming a communication with the inlet water-passage o'. A pipe, S, (which surrounds the pipe R, so as to form an annular water-way, r,) connects the lower end of the outer casing, N, with the inlet water-passage o'. The discharge-pipe L connects the base of the primary filtering apparatus with the inlet water-passage o, and the discharge-pipe T leads from the outlet water-passage $o^3$ to such place or places as it may be required.

When, as shown in Fig. 1, the valve P is lowered to close the opening $o^5$ and the valve Q is raised to open the opening $o^6$, the operation of this part of my invention is as follows: The water from the primary filtering apparatus passes through the pipe L and enters the passage o, and then passes through the following course: Through the opening $o^4$ and passage o', annular water-ways r and n, and into the top of the cylinder M, passing downward through animal charcoal or other filtering material contained in said cylinder. The purified water then passes through the pipe R, passage $o^2$, opening $o^6$, and passage $o^3$, and is carried off through the pipe T to any place where it may be required. To throw the chemical purifier out of service, the valve P must be raised to close the opening $o^4$ and open the opening $o^5$, as shown in Fig. 5, and at the same time the valve Q must be lowered to close the opening $o^6$. When thus arranged, the water from the pipe L will pass through the opening $o^5$ and passage $o^3$ directly to the pipe T without passing through the chemical filter. When the valves P and Q are arranged as last described, and after removing the upper half of the casing N, the cylinder M can be taken out for the purpose of examination or for renewing the filtering material without interfering with the flow of water.

I claim as my invention—

1. In a filtering apparatus, the combination, with a base provided with a valve-seat having at opposite ends induction-ports and an intermediate eduction-port, and a slide-valve of insufficient length to cover both of said induction-ports at the same time, the said base containing two independent unfiltered-water passages and a waste-water outlet, which are separated from an underlying filtered-water chamber, also contained in said base, of two independent filtering-chambers erected on said base, and each consisting of an inner cylinder for containing the filtering material, and an outer casing which surrounds said inner cylinder, so as to form an annular water-way between said cylinder and casing, each of said inner cylinders being connected by its own outlet water-pipe with the filtered-water chamber of the base, and each of said casings being connected by an independent inlet water-pipe with the unfiltered-water passage of said base, the filtered-water chamber of said base being provided with an outlet-pipe for the filtered water, as and for the purpose specified.

2. In a filtering apparatus, the combination of a filtering-chamber for containing animal charcoal or other purifying material, said chamber consisting of an inner cylinder, M, and an outer casing, N, so as to form an annular water-way, n, a base, O, provided with a lower inlet water-passage, o, an upper inlet water-passage, o', an upper outlet water-passage, $o^2$, and a lower outlet water-passage, $o^3$, said lower inlet water-passage having through its upper side an opening, $o^4$, which communicates with said upper inlet water-passage, said lower inlet water-passage also having at its lower side an opening, $o^5$, which leads directly into said outlet water-passage, the openings $o^4$ and $o^5$ being directly opposite each other and having a double-faced valve, P, fitted thereto and arranged to operate so as to reciprocally close one of said openings when the other is opened, the upper outlet water-passage, $o^2$, being connected to the lower outlet water-passage, $o^3$, by an opening, $o^6$, in which a valve, Q, is fitted to close the communication between said outlet water-passages, the inner cylinder, M, being connected by a pipe, R, to the outlet water-passage $o^2$, and the outer casing, N, being connected by a pipe, S, to the inlet water-passage o, as and for the purpose herein specified.

3. In a filtering apparatus, a percolating-bed composed of alternately-arranged reciprocating and stationary bars which are fitted side by side to form leaky joints through which the water will ooze, said reciprocating bars having an endwise movement and being so fitted in respect to said stationary bars as to always form a barrier to the escape of the filtering material, as and for the purpose herein specified.

JAMES H. BLESSING.

Witnesses:
JOHN W. WHEELOCK,
WM. H. LOW.